(12) United States Patent
Nishiwaki et al.

(10) Patent No.: US 8,451,539 B2
(45) Date of Patent: May 28, 2013

(54) OPTICAL ELEMENT HAVING TRANSMITTING LAYERS WITH RESPECTIVE BLAZED SURFACES AND ABBE NUMBERS

(75) Inventors: Seiji Nishiwaki, Hyogo (JP); Tsuguhiro Korenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/165,106

(22) Filed: Jun. 21, 2011

(65) Prior Publication Data

US 2011/0249345 A1 Oct. 13, 2011

Related U.S. Application Data

(62) Division of application No. 11/575,595, filed as application No. PCT/JP2005/017773 on Sep. 27, 2005, now abandoned.

(30) Foreign Application Priority Data

Sep. 29, 2004 (JP) ................. 2004-283857

(51) Int. Cl.
*G02B 5/18* (2006.01)
(52) U.S. Cl.
USPC .......................... 359/576; 359/571
(58) Field of Classification Search
None
See application file for complete search history.

(56) References Cited

U.S. PATENT DOCUMENTS

| | | |
|---|---|---|
| 5,847,877 A | 12/1998 | Imamura et al. |
| 6,157,488 A | 12/2000 | Ishii |
| 6,760,159 B2 | 7/2004 | Nakai |
| 6,781,756 B1 | 8/2004 | Ishii |
| 7,692,875 B2 | 4/2010 | Nishiwaki et al. |
| 2001/0036012 A1 | 11/2001 | Nakai et al. |
| 2002/0036827 A1 | 3/2002 | Nakai |

FOREIGN PATENT DOCUMENTS

| | | |
|---|---|---|
| JP | 9-127321 | 5/1997 |
| JP | 11-084118 | 3/1999 |
| JP | 2002-107520 | 4/2002 |
| JP | 2005-164840 | 6/2005 |

OTHER PUBLICATIONS

Co-pending U.S. Appl. No. 11/575,595, filed Mar. 20, 2007.
International Search Report for related Application No. PCT/JP2005/017773 mailed Dec. 22, 2009.
Form PCT/ISA/237 and partial translation for related Application No. PCT/JP2005/017773 mailed Dec. 27, 2005.
Oyo Hikari Electronics Handbook; published by Shokodo Co., Ltd.; pp. 474-477.
Takehiko Nakai; "White Light Diffraction Lens;" Kogaku, vol. 32, No. 8; 2003; pp. 476-482.
European Search Report for corresponding Application No. 05787554.4 dated Feb. 5, 2009.

*Primary Examiner* — Arnel C Lavarias
(74) *Attorney, Agent, or Firm* — Renner, Otto, Boisselle & Sklar, LLP

(57) ABSTRACT

An optical element including: a first light transmitting layer having a first sawtooth blazed surface, the first light transmitting layer including a plurality of first light-transmitting slopes defining a first blaze angle α; and a second light transmitting layer having a second sawtooth blazed surface including a plurality of second light-transmitting slopes defining a second blaze angle β, the second light transmitting layer being in contact with the first sawtooth blazed surface of the first light transmitting layer. A tilting direction of the first light-transmitting slope and a tilting direction of the second light-transmitting slope are opposite.

7 Claims, 16 Drawing Sheets

OPTICAL ELEMENT HAVING TRANSMITTING LAYERS WITH RESPECTIVE BLAZED SURFACES AND ABBE NUMBERS

TECHNICAL FIELD

The present invention relates to an optical element, an in particular to a light-converging device for converging light, such as a lens, and a diffraction device for diffracting light, such as a grating.

BACKGROUND ART

A blazed grating is an optical element having a sawtooth blazed surface, which includes a plurality of light-transmitting slopes. A light-converging device having a blazed grating on its surface is disclosed in Non-Patent Document 1 and Patent Document 1.

With reference to FIG. 10 and FIG. 11, a conventional example of a light-converging device will be described.

The light-converging device shown in FIG. 10 comprises a substrate 1, which is formed of a transparent material such as plastic and has surfaces 1a and 1b. The substrate 1 has a lens shape which is symmetric around its optical axis, and has a grating 1G formed on the surface 1b thereof, the grating 1G having a sawteeth-shaped cross section. The lens surfaces 1a and 1b of the light-converging device constitute a sphere or non-sphere, with its center axis being the optical axis L. On the surface 1b, the plurality of light-transmitting slopes composing the grating 1G each have an annular shape whose center axis is the optical axis L, and are arrayed in a radial direction. Thus, steps of the grating are formed in concentric circles centered around the optical axis.

Light 2 which enters the substrate 71 is refracted by the surface 1a, and thereafter simultaneously receives refraction and diffraction at the surface 1b on which the grating 1G is formed. Light 3 going out from the light-converging device is converged on a detection surface 4.

Next, with reference to FIG. 11, the principle of diffraction by the lens surface 1b of the light-converging device shown in FIG. 10 will be described. For simplicity, FIG. 11 illustrates the surface 1b as being planar.

The device shown in FIG. 11 has a substrate 1 having a grating 1G formed on a surface 1b thereof, the grating 1G having a sawteeth-like cross section. The substrate 1 has a refractive index n. The grating 1G has a pitch $\Lambda$. The grating 1G diffracts light 2 of the wavelength $\lambda$, thus generating diffracted light such as $1^{st}$-order diffracted light 3 and $2^{nd}$-order diffracted light 3".

For simplicity, assuming that the incident angle of the light 2 (i.e., the angle between the normal of the rear face of the substrate 1 and the axis of the light 2) is zero, the diffraction angle $\theta$ of the $q^{th}$-order diffracted light (i.e., the angle between the normal and the diffracted light) is expressed by (eq. 1) below.

$$\sin\theta = q\lambda/\Lambda \quad \text{(eq. 1)}$$

Herein, q is an integer representing the order of the diffracted light.

In the case of $0^{th}$-order light 3', q=0, and the diffraction angle $\theta$ is zero. Generally speaking, $-1^{st}$-order diffracted light and $-2^{nd}$-order diffracted light are also generated on opposite sides of the $0^{th}$-order light 3'. However, since the grating 1G has a sawteeth-like cross section, diffracted light of any − order will be weakened, whereas diffracted light of any + order will be intensified. When a step height d in the cross section of the grating 1G satisfies (eq. 2) below, the diffraction efficiency of the $q^{th}$-order diffracted light becomes maximum.

$$d = |q\lambda/(n-1)| \quad \text{(eq. 2)}$$

Herein, n is the refractive index of the substrate (transparent medium), and $\lambda$ is the wavelength of the incident light 2. Note that the pitch $\Lambda$ does not need to be constant across the surface of the substrate 1, and the pitch $\Lambda$ may be a mathematical function of position on the substrate 1. By varying the pitch $\Lambda$ as a mathematical function of position, it becomes possible to adjust the diffraction angle in accordance with the outgoing position from the substrate 1. By doing so, and assisted also by the spherical shape of the surfaces 1a and 1b, etc., it becomes possible to converge the diffracted light 3 at one point.

Next, with reference to FIG. 12 and FIG. 13, another conventional technique will be described. This conventional technique has a construction as taught in Patent Document 1.

A light-converging device shown in FIG. 12 is formed of two types of transparent media having different refractive indices and dispersion characteristics (plastic, UV-curing resin, or the like). A lens portion 1 is formed of a first material, and has a lens shape. A grating 1G having a sawteeth-like cross section is formed on a surface 1b, thus presenting a construction similar to that of the lens 1 of FIG. 10. This light-converging device differs from the light-converging device of FIG. 10 in that a transparent layer 7 formed of a second material covers the lens surface 1b on which the grating 1G is formed. A surface 7S of the transparent layer 7 does not reflect the protrusions and depressions of the grating 1G, but has a smooth shape conforming to the lens surface 1b.

The second material has a higher refractive index and a lower dispersion than those of the first material. As a method for producing the light-converging device, for example, a step of pushing the lens portion 1 (already having the grating 1G formed thereon) into a die, a step of filling the interspace between the lens portion 1 and the die with a second material and subjecting it to UV curing, a step of releasing the die from the lens portion 1, and so on may be consecutively performed.

Light 2 which enters the light-converging device is refracted by the surface 1a of the lens portion 1, and thereafter simultaneously receives refraction and diffraction by the grating 1G. Light 3 going out from the light-converging device is converged on a detection surface 4. Furthermore, when it is transmitted through the surface 7S of the transparent layer 7, it is further refracted so as to be converged on the detection surface 4.

Next, with reference to FIG. 13, the principle of diffraction by the light-converging device shown in FIG. 12 will be described. Again, for simplicity, the face 1a and the face 1b will be described as being planar. It is assumed that the substrate 1 has a refractive index n; the transparent layer 7 has a refractive index n'; and the grating 1G formed on the face 1b has a sawteeth-like cross section with a pitch $\Lambda$.

Light 2 of the wavelength $\lambda$ is diffracted by the grating 1G into $1^{st}$-order diffracted light 3, $2^{nd}$-order diffracted light 3", and the like. The relationship between the diffraction directions and the direction of sawteeth is opposite to that associated with the grating 1G shown in FIG. 11. This is because the refractive indices satisfy the relationship n<n'.

Assuming that the incident angle of the light 2 (i.e., the angle between itself and the surface normal) is zero, the diffraction angle $\theta$ of $q^{th}$-order diffracted light (i.e., the angle between itself and the surface normal) is given by (eq. 1) above. In the case of $0^{th}$-order light 3', q=0 and the diffraction angle is zero. Generally speaking, $-1^{st}$-order diffracted light and $-2^{nd}$-order diffracted light are also generated on opposite sides of the $0^{th}$-order light 3'. However, by adopting a sawteeth-like grating cross section, diffracted light of any – order will be weakened, whereas diffracted light of any + order will be intensified. When a depth d of the grating cross section satisfies (eq. 3) below, the diffraction efficiency of the $q^{th}$-order diffracted light becomes maximum.

$$d=|q\lambda/(n'-n)| \quad (\text{eq. 3})$$

Note that the pitch $\Lambda$ does not need to have a constant value. By ensuring that the pitch $\Lambda$ is a mathematical function of position, it becomes possible to adjust the diffraction angle, and assisted also by the spherical shape of the surfaces 1a and 1b, etc., it becomes possible to converge the diffracted light 3 at one point.

[Non-Patent Document 1] Oyo Hikari Electronics Handbook (published by Shokodo Co., Ltd.), P 474-477
[Patent Document 1] Japanese Laid-Open Patent Publication No. 9-127321

DISCLOSURE OF INVENTION

Problems to be Solved by the Invention

Such conventional light-converging devices and diffraction devices have the following problems.

FIG. 14 is a graph showing the dispersion characteristics of the substrate 1 of the first conventional example of a light-converging device. A curve 5 shown in the graph represents a relationship between the refractive index of an optical material which may be used for the substrate 1 and wavelength. As can be seen from FIG. 14, in the visible light region, the refractive index monotonously increases as the wavelength becomes shorter. Every optical material has such dispersion characteristics. For example, in the case of ZEONEX, a refractive index at the C line (wavelength $\lambda_C$=0.6563 µm) is $n_C$=1.522983; and a refractive index at the F line (wavelength $\lambda_F$=0.4861 µm) is $n_F$=1.532271. In the case of polycarbonate, a refractive index at the C line is $n_C$=1.578401; and a refractive index at the F line is $n_F$=1.597809.

FIG. 15 is a graph showing a relationship between diffraction efficiency and wavelength in the case where the substrate 1 is produced from a plastic material whose refractive index at the d line (wavelength $\lambda_d$=0.5876 µm) is $n_d$=1.60 and whose Abbe number is $\nu$=33. This plastic material is a generic material which is actually used in eyeglasses and the like. The grating has a structure as shown in FIG. 11, where step height d=0.83 µm. By approximation, the refractive index n at the wavelength $\lambda$ is expressed by (eq. 4) below.

$$n=n_d-(\lambda_d^{-2}-\lambda^{-2})(n_d-1)/\nu(\lambda_F^{-2}-\lambda_C^{-2}) \quad (\text{eq. 4})$$

In the graph of FIG. 15, the diffraction efficiencies of $0^{th}$-order light, $1^{st}$-order diffracted light, and $2^{nd}$-order diffracted light are represented by a curve 6', a curve 6, and a curve 6", respectively.

The diffraction efficiency (curve 6) of $1^{st}$-order diffracted light has a local maximum near the wavelength of 0.51 µm, but decreases away from the wavelength of 0.50 µm. The diffraction efficiencies of $0^{th}$-order light and $2^{nd}$-order diffracted light increase away from the wavelength of 0.51 µm. This is because the condition for maximum diffraction efficiency as expressed by (eq. 2) depends on the wavelength and refractive index.

As the wavelength becomes smaller than the optimum value (0.51 µm) for $1^{st}$-order diffraction, the numerator on the right-hand side of (eq. 2) decreases, and the denominator (n−1) increases due to dispersion characteristics. On the other hand, as the wavelength becomes greater than the optimum value (0.51 µm) for $1^{st}$-order diffraction, the numerator $\lambda$ on the right-hand side of (eq. 2) increases, and the denominator (n−1) decreases. Thus, as the wavelength shifts away from the value at which the efficiency of $1^{st}$-order diffraction is maximum, both the refractive index (denominator) and the wavelength (numerator) change so that the diffraction efficiency drastically decreases.

Therefore, as for light of a specific wavelength, the light-converging device shown in FIG. 10 allows only the $1^{st}$-order diffracted light 3 to be converged on the detection surface 4. However, as for light of any other wavelength, other diffracted light (stray light for $1^{st}$-order diffracted light 3) such as $0^{th}$-order light 3' and $2^{nd}$-order diffracted light 3" will occur. When the light-converging device is used as a camera lens, the existence of such stray light invites deterioration in the reproduced image.

The light-converging device shown in FIG. 12 and FIG. 13 can solve such problems. FIG. 16 is a graph showing the dispersion characteristics (wavelength dependence characteristics of refractive index) of the materials composing the substrate 1 (first material) and the transparent layer 7 (second material) shown in FIG. 13.

The refractive index of the first material monotonously increases as the wavelength becomes shorter (curve 5). The refractive index of the second material also monotonously increases as the wavelength becomes shorter (curve 5'). The second material has a higher refractive index and a smaller dispersion than those of the first material. In terms of equations, this is expressed as (eq. 5) and (eq. 6) below.

$$n_F'>n_F \text{ and } n_C'>n_C \quad (\text{eq. 5})$$

$$(n_C'-n_C)/(n_F'-n_F)>1 \quad (\text{eq. 6})$$

Herein, it is assumed that the refractive indices of the first material and second material at the C line are $n_C$ and $n_C'$, and that their refractive indices at the F line are $n_F$ and $n_F'$.

If (eq. 5) and (eq. 6) can be satisfied, deviation from the condition for maximum diffraction efficiency as expressed by (eq. 3) can be alleviated. In other words, when the wavelength becomes smaller than the optimum value due to the dispersion characteristics of the substrate 1 and the transparent layer 7, the numerator 1 on the right-hand side of (eq. 3) will decrease, but the denominator (n'−n) will also decrease. On the other hand, when the wavelength becomes greater than the optimum value, the numerator 1 on the right-hand side of (eq. 3) will increase, but the denominator (n'−n) will also increase. In either case, deviation from the condition for maximum diffraction efficiency is alleviated.

However, generally speaking, dispersion increases as the refractive index increases. In other words, an optical material having a relatively high refractive index has a relatively large dispersion, and an optical material having a relatively small dispersion has a relatively small refractive index. Therefore, there are very few combinations of optical materials that simultaneously satisfy (eq. 5) and (eq. 6). If at all there is, the effect will be small (e.g., the left-hand side of (eq. 6) becoming closer to 1). Therefore, in actuality, the light-converging device shown in FIG. 12 has not been put to practical use.

The present invention has been made in order to solve the above problems, and a main objective thereof is to provide an optical element which, while using an optical material that is actually usable, maintains a high diffraction efficiency and suppresses stray light across a broad wavelength region.

Means for Solving the Problems

An optical element according to the present invention is an optical element comprising: a first light transmitting layer having a first sawtooth blazed surface, the first sawtooth blazed surface including a plurality of first light-transmitting slopes defining a first blaze angle; a second light transmitting layer having a second sawtooth blazed surface including a plurality of second light-transmitting slopes defining a second blaze angle, the second light transmitting layer being in contact with the first sawtooth blazed surface of the first light transmitting layer, wherein, a tilting direction of the first light-transmitting slopes and a tilting direction of the second light-transmitting slopes are opposite.

In a preferred embodiment, the first light transmitting layer has a lens shape.

In a preferred embodiment, a lens-shaped member is further comprised, wherein, the first light transmitting layer is supported by the lens-shaped member.

In a preferred embodiment, the first light-transmitting slopes on the first sawtooth blazed surface are arranged with an arraying pitch which varies with position on the first light transmitting layer.

In a preferred embodiment, when the first light transmitting layer has a refractive index n; the second light transmitting layer has a refractive index n'; the first sawtooth blazed surface has a step height d; the second sawtooth blazed surface has a step height d'; and light being used has an average wavelength $\lambda$, $\{d'(n'-1)-d(n-n')\}/\lambda$ is within a range of $\pm 0.2$ around an integer value.

In a preferred embodiment, when the first light transmitting layer has an Abbe number $\nu$; the second light transmitting layer has an Abbe number $\nu'$; the first sawtooth blazed surface has a step height d; and the second sawtooth blazed surface has a step height d', the relationship $d'/d < \nu'/\nu - 1$ is satisfied.

In a preferred embodiment, a refractive index and dispersion of the first light transmitting layer are higher than a refractive index and dispersion of the second light transmitting layer.

In a preferred embodiment, an amount of offset $\delta$ between an arbitrary one of the plurality of first light-transmitting slopes and the second light-transmitting slope through which light having been transmitted through the first light-transmitting slope is transmitted is 5% or less of an arraying pitch $\Lambda$ of the first light-transmitting slope where the first light-transmitting slope is positioned.

In a preferred embodiment, when a pitch of the first sawtooth blazed surface is expressed as m×$\Lambda$, a pitch of the second sawtooth blazed surface is expressed as n×$\Lambda$, each of m and n being an integer of 1 or more.

An optical element according to the present invention is an optical element comprising: a first light transmitting layer having a first sawtooth blazed surface, the first sawtooth blazed surface including a plurality of first light-transmitting slopes defining a first blaze angle; a second light transmitting layer having a second sawtooth blazed surface including a plurality of second light-transmitting slopes defining a second blaze angle, the second light transmitting layer being in contact with the first sawtooth blazed surface of the first light transmitting layer, wherein, when p and q are integers of different signs other than zero, 80% or more of light which is transmitted through the first light transmitting layer is diffracted as $p^{th}$-order light; and 80% or more of light which is transmitted through the second light transmitting layer is diffracted as $p^{th}$-order light.

In a preferred embodiment, when the first light transmitting layer has an Abbe number $\nu$; the second light transmitting layer has an Abbe number $\nu'$; the first sawtooth blazed surface has a step height d; and the second sawtooth blazed surface has a step height d', the relationship $d'/d < \nu'/\nu - 1$ is satisfied.

In a preferred embodiment, a refractive index and dispersion of the first light transmitting layer are higher than a refractive index and dispersion of the second light transmitting layer.

In a preferred embodiment, the relationship p+q=1 is satisfied.

In a preferred embodiment, when the first light transmitting layer has a refractive index n; the second light transmitting layer has a refractive index n'; the first sawtooth blazed surface has a step height d; the second sawtooth blazed surface has a step height d'; and light being used has an average wavelength $\lambda$, the relationship $0.7\lambda < |(n-n')d/p| < 1.2\lambda$; and the relationship $0.7\lambda < |(n'-1)d'/q| < 1.2\lambda$ are satisfied.

In a preferred embodiment, an amount of offset $\delta$ of the second sawtooth blazed surface with respect to the first sawtooth blazed surface is 5% or less of a pitch $\Lambda$ of the first sawtooth blazed surface.

In a preferred embodiment, when a pitch of the first sawtooth blazed surface is expressed as m×$\Lambda$, a pitch of the second sawtooth blazed surface is expressed as n×$\Lambda$, each of m and n being an integer of 1 or more.

Effects of the Invention

According to the present invention, owing to a novel arrangement of two stacked gratings, a high diffraction efficiency can be maintained across a broad wavelength region, and stray light can be suppressed. Moreover, by adjusting the step heights of two sawteeth cross sections, the variation of combinations of transparent materials can be greatly expanded.

Figure 1:
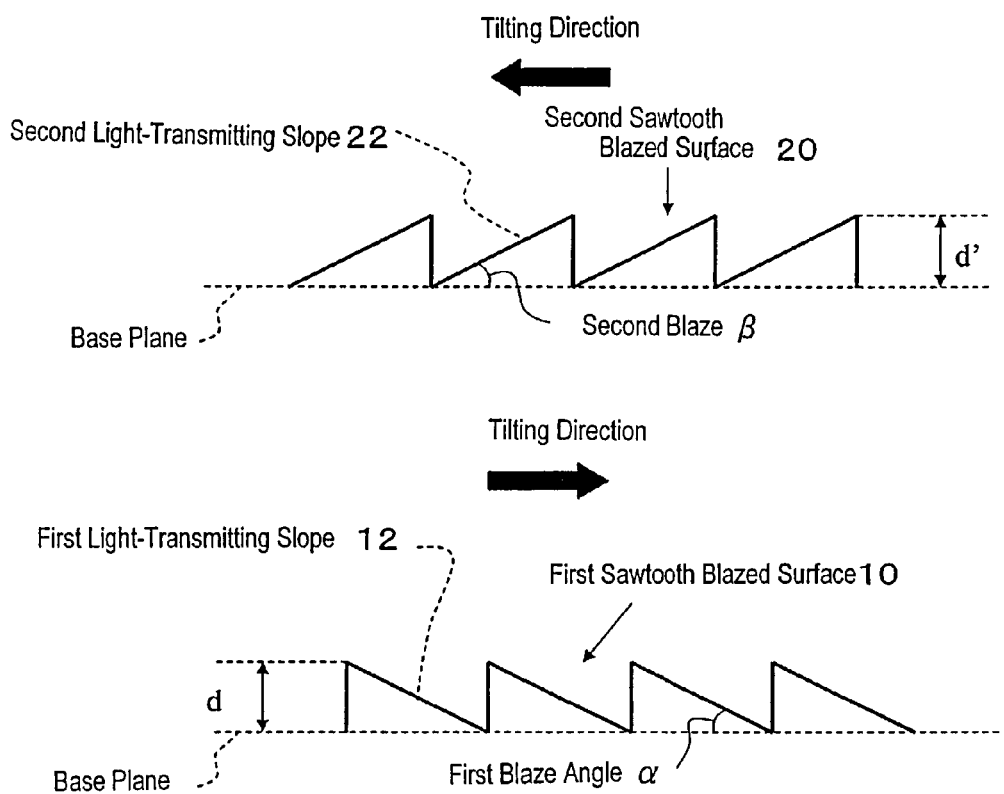
FIG. 1 A cross-sectional view schematically showing the general construction of an optical element according to the present invention.

DESCRIPTION OF THE REFERENCE NUMERALS 1 substrate (first light transmitting layer)
1G grating (first sawtooth blazed surface)
1a,1b surface of substrate
2 incident light
3 $1^{st}$-order diffracted light
3' $0^{th}$-order light
3" $2^{nd}$-order diffracted light
4 detection surface
7 transparent layer (second light transmitting layer)
7S surface of transparent layer
7G grating (second sawtooth blazed surface)
10 first sawtooth blazed surface
12 first light-transmitting slope
20 second sawtooth blazed surface
22 second light-transmitting slope
L optical axis
α first blaze angle
β second blaze angle

BEST MODE FOR CARRYING OUT THE INVENTION

An optical element according to the present invention includes a first light transmitting layer having a first sawtooth blazed surface and a second light transmitting layer having a second sawtooth blazed surface, these being stacked. First, with reference to FIG. 1, the outline of the construction of an optical element according to the present invention will be described.

FIG. 1 schematically shows, in cross sections, first sawtooth blazed surface 10 and a second sawtooth blazed surface 20 of an optical element according to the present invention. The first sawtooth blazed surface 10 has a plurality of first light-transmitting slopes 12 defining a first blaze angle α, whereas the second sawtooth blazed surface 20 has a plurality of second light-transmitting slopes 22 defining a second blaze angle β.

The first sawtooth blazed surface 10 and the second sawtooth blazed surface 20 are each structured with a periodical array of unit features, each of whose cross section has a triangular shape. The height of the unit features with respect to a base plane does not need to be identical between the first sawtooth blazed surface 10 and the second sawtooth blazed surface 20. In the example shown, the height of each unit feature (referred to as the "step height") of the first sawtooth blazed surface 10 is denoted as "d", whereas the step height of the second sawtooth blazed surface 20 is denoted as "d'".

In the present specification, between the two faces constituting the surface of each unit feature, the face having a relatively broader area will be referred to as a "light-transmitting slope", and the angle between this light-transmitting slope and the base plane will be defined as a blaze angle. Between the two faces constituting the surface of each unit feature, the face other than the "light-transmitting slope" is generally perpendicular to the base plane, and has substantially no effect on light diffraction.

The aforementioned blaze angle has a value satisfying the relationships of 0°<α<90° and 0°<β<90°, and is an acute angle. The normal directions of the first and second light-transmitting slopes 12 and 22 are tilted with respect to the normal direction of the base plane by an angle which is equal to the blaze angle. In the present specification, the direction of this tilt will be referred to as "the tilting direction of the light-transmitting slope", as indicated by thick black arrows in FIG. 1. In the present invention, the tilting directions of the light-transmitting slopes are set exactly opposite between the first sawtooth blazed surface 10 and the second sawtooth blazed surface 20.

Although FIG. 1 illustrates a case where the base plane is planar, the base plane may be curved. Moreover, the blaze angles α and β do not need to have constant values across the base plane, but may vary with position.

Although not explicitly shown in FIG. 1, the first sawtooth blazed surface 10 is formed on a first light transmitting layer, whereas the second sawtooth blazed surface 20 is formed on a second light transmitting layer which is in contact with the first sawtooth blazed surface 10. The first light transmitting layer does not need to be a plate member having a uniform thickness, but may be a substrate having a lens shape. Moreover, the first light transmitting layer may be supported on another transparent member.

Through descriptions of preferred embodiments of the present invention, it will be explained what sort of functions and effects are exhibited by an optical element according to the present invention adopting the aforementioned construction.

Hereinafter, embodiments of the present invention will be specifically described with reference to the drawings.

Embodiment 1

With reference to FIG. 2 to FIG. 8, a first embodiment of the optical element according to the present invention will be described. The optical element of the present embodiment is a light-converging device.

Figure 2:
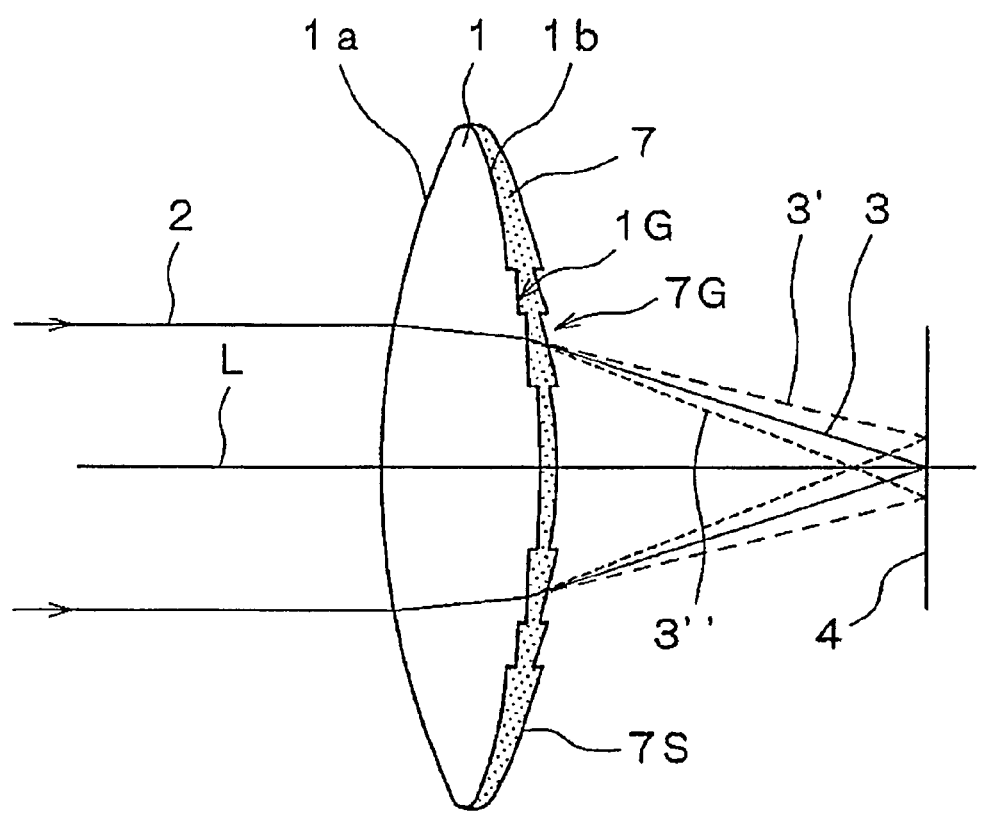
FIG. 2 A cross-sectional view showing a first embodiment of an optical element according to the present invention.

First, FIG. 2 is referred to. The light-converging device shown in FIG. 2 is produced from two types of transparent materials (plastic, UV-curing resin, or the like) having different refractive indices and different dispersion characteristics. A substrate 1 which is composed of a first material has a lens shape, and has a light-incident face 1a and a light-outgoing face 1b. A grating 1G is formed on the light-outgoing surface 1b of the substrate 1, the grating 1G having a sawteeth-shaped cross section. The substrate 1 functions as a "first light transmitting layer".

The surfaces 1a and 1b of the substrate 1 constitute a sphere or non-sphere, with its center axis being an optical axis L. On the surface 1b, the plurality of light-transmitting slopes composing the grating 1G each have an annular shape whose center axis is the optical axis L, and they are arrayed in radial directions. Thus, steps of the grating are formed in concentric circles centered around the optical axis.

A transparent layer 7 which is composed of a second material is formed on the light-outgoing surface 1b of the substrate 1 on which the grating 1G is formed, and functions as a "second light transmitting layer". A grating 7G is formed on a surface 7S of the transparent layer 7, the grating 7G having a "tilting direction" which is opposite to the "tilting direction" of the grating 1G. On the surface 7S, too, the plurality of light-transmitting slopes composing the grating 7G each have an annular shape whose center axis is the optical axis L, and they are arrayed in radial directions.

In the present embodiment, each "tilting direction" shown in FIG. 1 either heads toward the optical axis L, or generally radially extends from the optical axis. Thus, in the present embodiment, when the "tilting directions" of the two stacked gratings 1G and 7G are in an exactly opposite relationship, it is meant that exactly opposite "tilting directions" exist at positions of upper-lower proximity (i.e., corresponding positions), and the relationship between "tilting directions" at different positions may not necessarily be exactly opposite.

Between the grating 1G and the grating 7G, the edge positions (lower-blade positions) of sawteeth are aligned. The refractive index and dispersion of the second material in the present embodiment are lower than the refractive index and dispersion of the first material. Preferably, the transparent layer 7 is formed so that its thickness is as thin as possible.

The light-converging device of the present embodiment is produced in the follow manner, for example.

First, the substrate 1 is provided, which has been molded so as to have a lens shape with a grating formed on a surface thereof. The substrate 1 is formed of a first material. Next, the substrate 1 is inserted into a die (not shown) which has a molding face having the shape of a lens with a grating, and the interspace between the substrate 1 and the die is filled with a second material. After curing the second material by a method such as UV curing or thermosetting, the second material is released from the die. As a result, the light-converging device shown in FIG. 2 is obtained.

After light 2 entering the light-converging device of the present embodiment is refracted from the surface 1a of the substrate 1, the light 2 simultaneously receives refraction and diffraction at the surface 1b of the substrate 1 on which the grating 1G is formed. Thereafter, the light 2 simultaneously receives refraction and diffraction at the surface 7S of the transparent layer 7 on which the grating 7G is formed, so as to be converged on a detection surface 4 as light 3.

Figure 3:
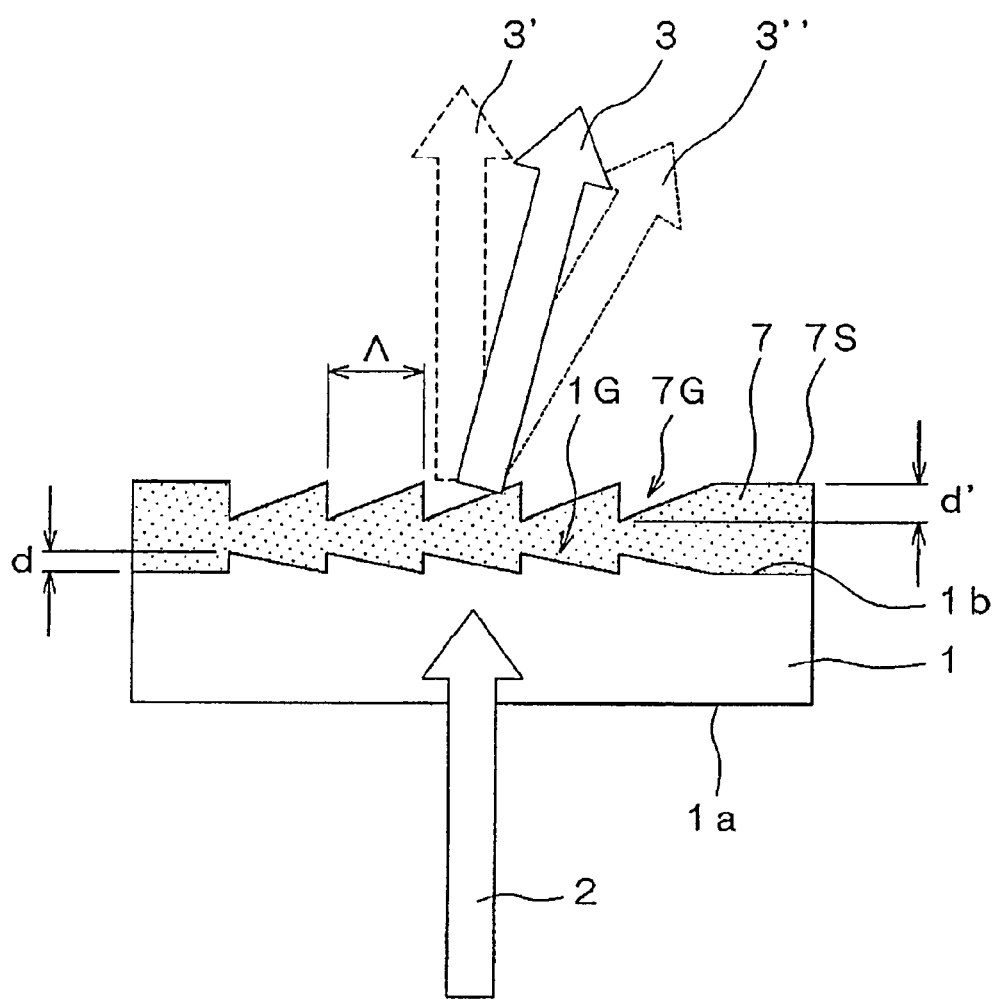
FIG. 3 A cross-sectional view for explaining the diffraction principle of the optical element of the first embodiment.

Next, with reference to FIG. 3, the diffraction by the optical element of the present embodiment will be described. For simplicity, FIG. 3 illustrates each face as being planar, while also assuming that the light 2 perpendicularly enters the face.

Firstly, it is assumed that the substrate 1 has a refractive index n; the transparent layer 7 has a refractive index n'; the grating 1G formed on the face 1b has a pitch $\Lambda$ and a cross-sectional step height d; the grating 7G formed on the face 7S has a pitch $\Lambda$ and a cross-sectional step height d'. In this case, the wavefront of the light which is transmitted through the gratings 1G and 7G will be in the form of sawteeth with the pitch $\Lambda$. The difference $\Delta$ (phase difference) at the wavefront is expressed by (eq. 7) below.

$$\Delta = d'(n'-1) - d(n-n') \quad (\text{eq. 7})$$

When the refractive indices n and n' are to be each separated into a portion (first term) which does not depend on the wavelength $\lambda$ and a portion (second term) which depends on the wavelength $\lambda$, approximations by the following two equations are possible.

$$n = n_O - (\lambda - \lambda_O)\sigma \quad (\text{eq. 8})$$

$$n' = n_O' - (\lambda - \lambda_O)\sigma' \quad (\text{eq. 9})$$

These equations are each obtained by a first-order approximation which is coarser than (eq. 4). Herein, $n_O$, $n_O'$, $\lambda_O$, $\sigma$, and $\sigma'$ are all positive numbers, where: $\lambda_O$ is a central wavelength; $n_O$ and $n_O'$ are refractive indices at the central wavelength; and $\sigma$ and $\sigma'$ are coefficients of dispersion. Therefore, a phase difference $\Delta$ can be expressed by (eq. 10) below.

$$\Delta = d'(n_O'-1) - d(n_O-n_O') - (\lambda-\lambda_O)\{d'\sigma' - d(\sigma-\sigma')\} \quad (\text{eq. 10})$$

Since the light 2 will have the phase difference $\Delta$ with a period of the pitch $\Lambda$, diffracted waves such as $1^{st}$-order diffracted light 3, and $2^{nd}$-order diffracted light 3'' will be generated. Thus, a condition under which the diffraction efficiency of $q^{th}$-order diffracted light becomes maximum is given by (eq. 11) below.

$$\Delta = q\lambda \quad (\text{eq. 11})$$

Herein, q is an integer.

Therefore, the condition under which the diffraction efficiency reaches maximum when $\lambda=\lambda_O$ and under which the amount of change of $|\Delta/\lambda|$ with respect to $\lambda$ becomes small (i.e., a condition under which a high diffraction light efficiency is maintained and stray light is suppressed across a broad wavelength region) is expressed by the following two equations:

$$\{d'(n_O'-1) - d(n_O-n_O')\}/\lambda = q \quad (\text{eq. 12});$$

and $$\{d'\sigma' - d(\sigma-\sigma')\}/q\lambda_O < 0 \quad (\text{eq. 13}).$$

(eq. 12) is a conditional expression for the diffraction efficiency to become maximum when $\lambda=\lambda_O$ (if the left-hand side is within a deviation of 0.2 or less with respect to the integer q, then it is fairly within the neighborhood of the local maximum). On the other hand, (eq. 13) is a conditional expression for making the amount of change of $|\Delta/\lambda|$ with respect to $\lambda$ small. As the absolute value of the left-hand side of (eq. 13) becomes greater, the amount of change of $|\Delta/\lambda|$ with respect to $\lambda$ can be made smaller.

Unlike in the conventional examples, the number of step height parameters is now increased to two, i.e., d and d', and therefore there can be a large number of combinations of optical materials that simultaneously satisfy (eq. 12) and (eq. 13). Note that the Abbe number is a value which is in proportion with an inverse of each of $\sigma$ and $\sigma'$. Therefore, assuming that Abbe numbers corresponding to $\sigma$ and $\sigma'$ are $\nu$ and $\nu'$, (eq. 13) can be replaced by (eq. 14) below.

$$d'/d < \nu'/\nu - 1 \quad (\text{eq. 14})$$

Now, the description will be continued by assuming that q=1. For simplicity, it is assumed that the incident angle of the light 2 shown in FIG. 3 (i.e., the angle between itself and the surface normal) is zero. In this case, the diffraction angle $\theta$ of $q^{th}$-order diffracted light (i.e., the angle between itself and the surface normal) is given by (eq. 1) above. As for $0^{th}$-order light 3', q=0, and the diffraction angle is zero. Generally speaking, $-1^{st}$-order diffracted light and $-2^{nd}$-order diffracted light are also generated on opposite sides of the $0^{th}$-order light 3'. However, since the gratings have sawteeth-like cross sections, diffracted light of any − order is weakened, whereas diffracted light of any + order is intensified.

Note that, instead of being sawteeth-like as shown, the grating cross sections may be in the form of steps inscribed within the illustrated sawteeth shape, or may be simple protrusions and depressions.

The pitch $\Lambda$ does not need to have a constant value within the plane. By ensuring that the pitch $\Lambda$ is a mathematical function of position, it becomes possible to adjust the diffraction angle, and assisted also by the spherical shape of the surfaces 1a and 1b, etc., it becomes possible to converge the diffracted light 3 at one point.

The diffraction phenomenon at the gratings 1G and 7G can also be explained as follows. Assuming that p and q are integers, suppose that the step height d and d' satisfy the following two equations.

$$d=|p\lambda_O/(n-n')| \quad \text{(eq. 15)}$$

$$d'=|q\lambda_O'/(n'-1)| \quad \text{(eq. 16)}$$

In this case, $p^{th}$-order light is diffracted by the grating 1G mainly at the wavelength of $\lambda_O$; $q^{th}$-order light is diffracted by the grating 7G mainly at the wavelength of $\lambda_O'$; and $(p+q)^{th}$-order light is diffracted by the entire gratings 1G and 7G at wavelengths in the neighborhood from $\lambda_O$ to $\lambda_O'$. In the example of FIG. 3, the relationship p+q=1 holds. Although the wavelengths $\lambda_O$ and $\lambda_O'$ are near, they do not need to be equal.

Figure 4:
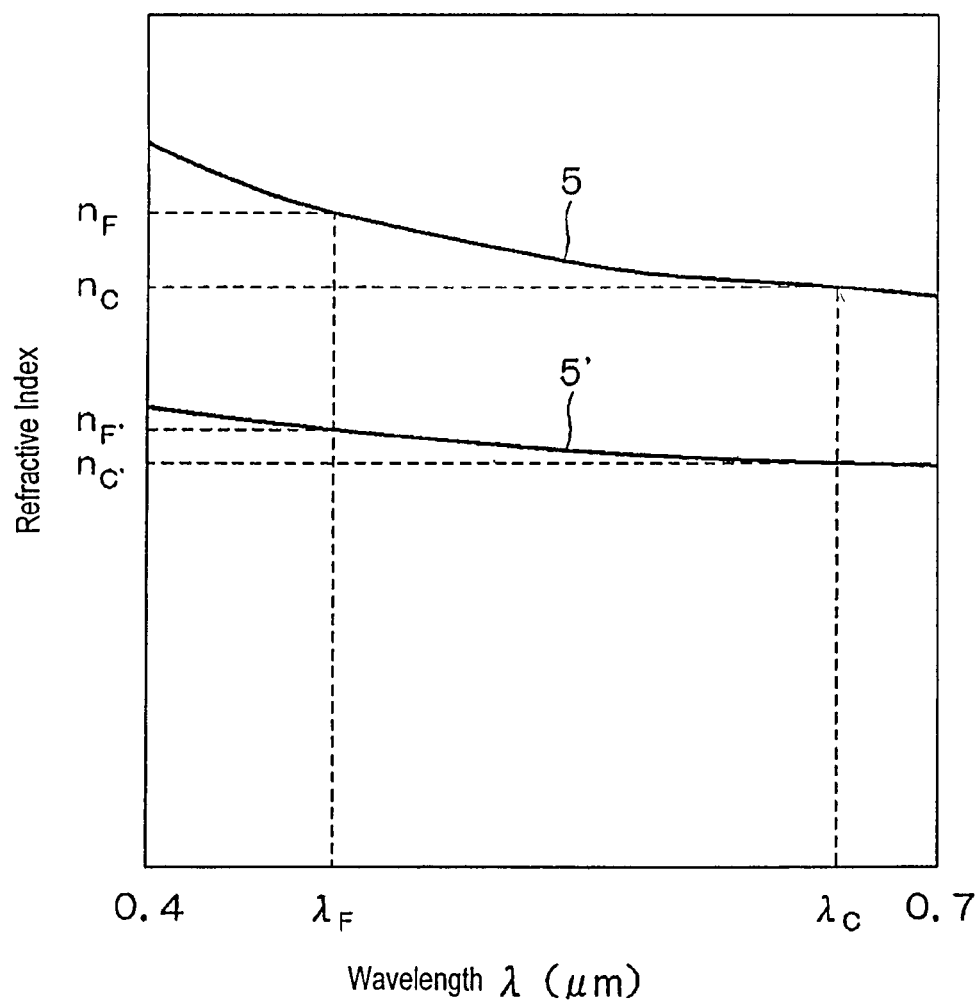
FIG. 4 A graph showing dispersion characteristics of a substrate 1 and a transparent layer 7 according to the first embodiment.

FIG. 4 is a graph showing the dispersion characteristics of the first material composing the substrate 1 and the second material composing the transparent layer 7 of the light-converging device of the present embodiment. The refractive index of the first material monotonously increases as the wavelength becomes shorter (curve 5). The refractive index of the second material also monotonously increases as the wavelength becomes shorter (curve 5'). The second material has a lower refractive index and a smaller dispersion than those of the first material. Therefore, assuming that the first material and the second material have refractive indices $n_C$ and $n_C'$ at the C line, and refractive indices $n_F$ and $n_F'$ at the F line, the following two inequalities hold true.

$$n_F' < n_F \text{ and } n_C' < n_C \quad \text{(eq. 17)}$$

$$(n_C' - n_C)/(n_F' - n_F) < 1 \quad \text{(eq. 18)}$$

(eq. 17) means $n_O > n_O'$, and (eq. 18) means $\sigma > \sigma'$. Therefore, from $(n_O - 1) > 1$ and $(n_O - n_O') > 1$, there are numerous d and d' that satisfy (eq. 12). Also from $(\sigma - \sigma') > 0$, there are numerous d and d' that satisfy $d'/d < (\sigma - \sigma')/\sigma'$, which is a transformation of (eq. 13). Therefore, under the conditions of (eq. 17) and (eq. 18), it is easy to satisfy (eq. 12) and (eq. 13), and the absolute value of the left-hand side of (eq. 13) can be set large with a certain amount of freedom.

Generally speaking, an optical material having a high refractive index has a large dispersion, and an optical material having a small dispersion has a small refractive index. Therefore, there are many combinations of optical materials that simultaneously satisfy (eq. 17) and (eq. 18), resulting in a great diversity of material combinations which is beyond comparison with conventional examples.

Note that the condition under which the diffraction efficiency reaches maximum when $\lambda = \lambda_O$ and under which the amount of change of $|\Delta/\lambda|$ with respect to $\lambda$ becomes small is still (eq. 12) and (eq. 13). It will be appreciated that, even if the refractive index condition is the same as the relationships of (eq. 5) and (eq. 6) of the conventional example, similar effects can be obtained so long as (eq. 12) and (eq. 13) are satisfied.

Figure 5:
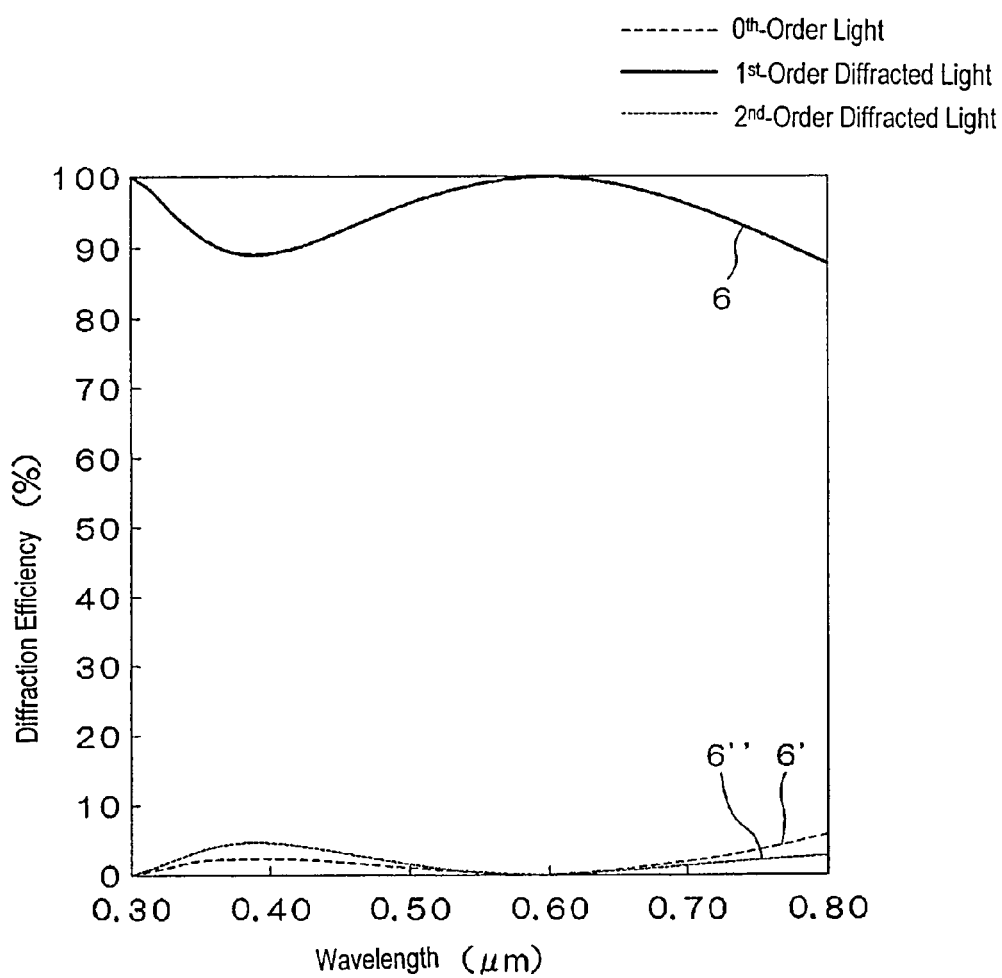
FIG. 5 A graph showing the wavelength dependence of diffraction efficiency of the optical element of the first embodiment.

FIG. 5 shows the wavelength dependence of diffraction efficiency of each diffracted light in the optical element of the present embodiment. In this optical element, the substrate 1 is formed of a plastic material whose refractive index is $n_d=1.67$ and Abbe number is $\nu=20$, and the transparent layer 7 is formed of a UV resin whose refractive index is $n_d=1.49$ and Abbe number is $\nu=59$. The grating step height d is 3.00 μm, and the step height d' is 2.31 μm. The refractive index n at the wavelength $\lambda$ is approximated according to (eq. 4).

As shown in FIG. 5, $1^{st}$-order diffracted light 6 has a local maximum near the wavelength of 0.60 μm, and the diffraction efficiency is slightly decreased in other wavelength ranges. This decrease is much smaller than in the conventional examples. Therefore, the diffraction efficiencies (curves 6', 6") of $0^{th}$-order light and $2^{nd}$-order diffracted light, which are stray light, are kept very low. Furthermore, the aforementioned refractive index and Abbe number values pertain to plastic materials and UV resin materials, which are already at a practical level. Thus, a great improvement effect can be obtained with realistic material combinations.

Figure 6:
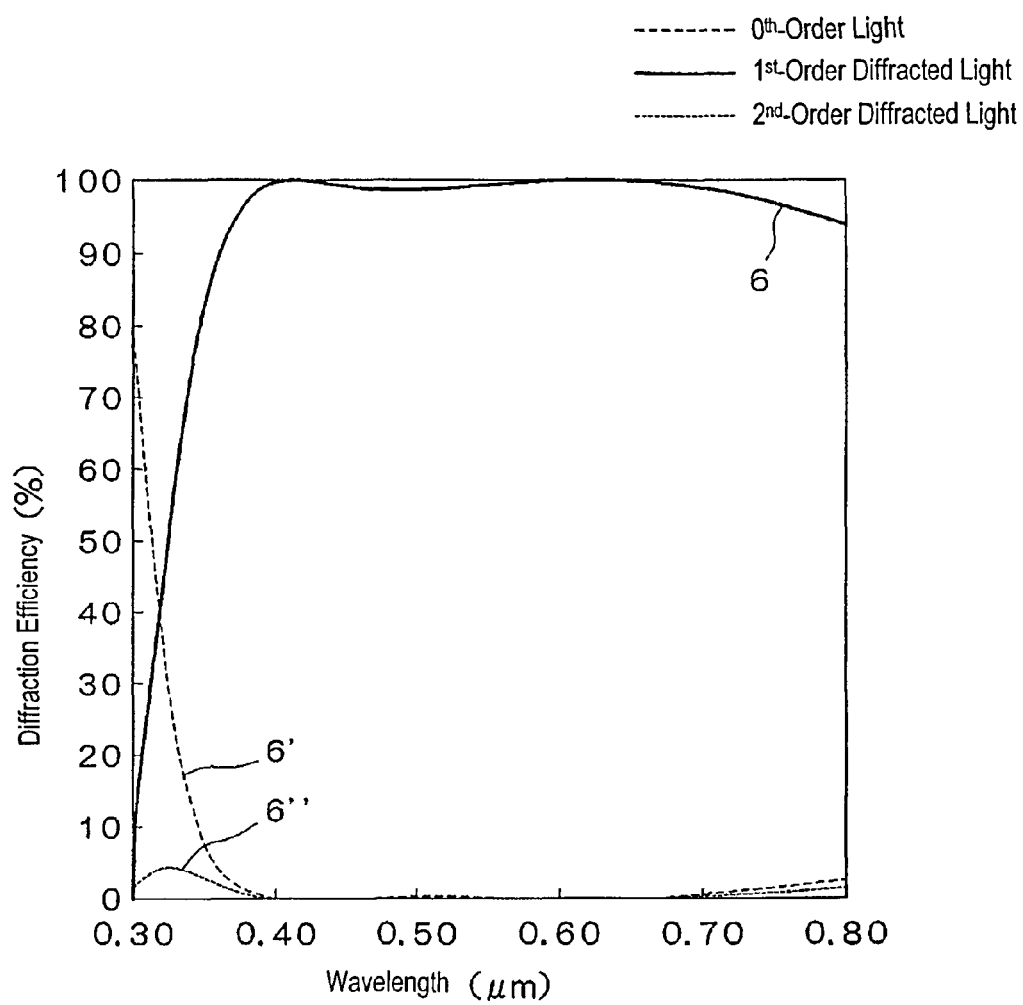
FIG. 6 A graph showing the wavelength dependence of diffraction efficiency of the optical element of the first embodiment.

FIG. 5 is a model in which $-1^{st}$-order light for light of $\lambda_O=0.540$ μm is diffracted by the grating 1G, $+2^{nd}$-order light for light of $\lambda_O'=0.566$ μm is diffracted by the grating 7G, and $1^{st}$-order light is diffracted by the entire gratings 1G and 7G. Other manners of diffraction are also permissible. For example, FIG. 6 is a graph showing results of calculating the diffraction efficiency obtained when the step heights of the sawteeth cross sections of the respective gratings are d=5.10 μm and d'=3.10 μm, the material of the substrate 1 has a refractive index $n_d=1.67$ and an Abbe number $\nu=18$, and the material of the transparent layer 7 has a refractive index $n_d=1.49$ and an Abbe number $\nu=59$. There is shown the diffraction efficiency of each diffracted light, in the case where $-2^{nd}$-order light for light of $\lambda_O=0.459$ μm is diffracted by the grating 1G, $+3^{rd}$-order light for light of $\lambda_O'=0.506$ μm is diffracted by the grating 7G, and $1^{st}$-order light is diffracted by the entire gratings 1G and 7G.

In the results of FIG. 6, central wavelengths $\lambda_O$ and $\lambda_O'$ of diffraction are shifted toward the shorter wavelength side than in FIG. 5. In the example of FIG. 6, the grating step heights are greater, but its characteristics are further improved from the characteristics of FIG. 5.

From the inventors' calculations, it has been found that: as the difference in refractive index between the substrate 1 and the transparent layer 7 ($n_O - n_O'$) increases, the step height d of the grating 1G can be made smaller; and as the difference in dispersion between the substrate 1 and the transparent layer 7 ($\sigma - \sigma'$) increases and the step height d of the grating 1G increases, it becomes possible to obtain a high diffraction efficiency in a broader wavelength range. An optimum value for the step height d' of the grating 7G is substantially uniquely determined once the other conditions (step height d of the grating 1G and the refractive index and Abbe number of each material) are determined.

Generally speaking, when formed of a material having a high refractive index, a refraction lens can realize a short optical path length and a high NA. On the other hand, a material having a low dispersion makes it possible to suppress defocusing associated with difference in wavelengths. However, commonly-available optical materials, whether glass or plastic, do not reconcile both a high refractive index and low dispersion. On the other hand, with a lens having gratings formed thereon as in the present embodiment, the dispersive power of refraction (wavelength dependence of refraction angle) can be canceled, by design, due to the dispersive power of diffraction (wavelength dependence of diffraction angle). As a result, it is not necessary to be concerned with the reconciliation of a high refractive index and low dispersion.

From the standpoint of ease of manufacture, the substrate 1 is preferably formed of a plastic material, and the transparent layer 7 is preferably formed of a UV-curing resin. Fortunately, UV-curing resins are low refractive index/low dispersion materials which suit the conditions of the present embodiment. Moreover, plastic materials boast a certain degree of variations, and even at present are capable of guaranteeing the optical performance of FIG. 5. Moreover, hitherto-performed plastic material development activities, in their efforts to reconcile both a high refractive index and low dispersion (high Abbe number), have tended to disregard high dispersion materials while also compromising on the realization of a high refractive index; however, once the low dispersion limitation is removed, the situation will greatly change. Therefore, according to the present embodiment, development activities of optical materials can be shifted from the reconciliation of a high refractive index and low dispersion to the reconciliation of a high refractive index and high dispersion, and to the reconciliation of a low refractive index and low dispersion, which would be more logical and natural in terms of physical properties. Thus, there is a great impact (an effect of curtailing losses associated with material development) on the entire business.

Figure 7:
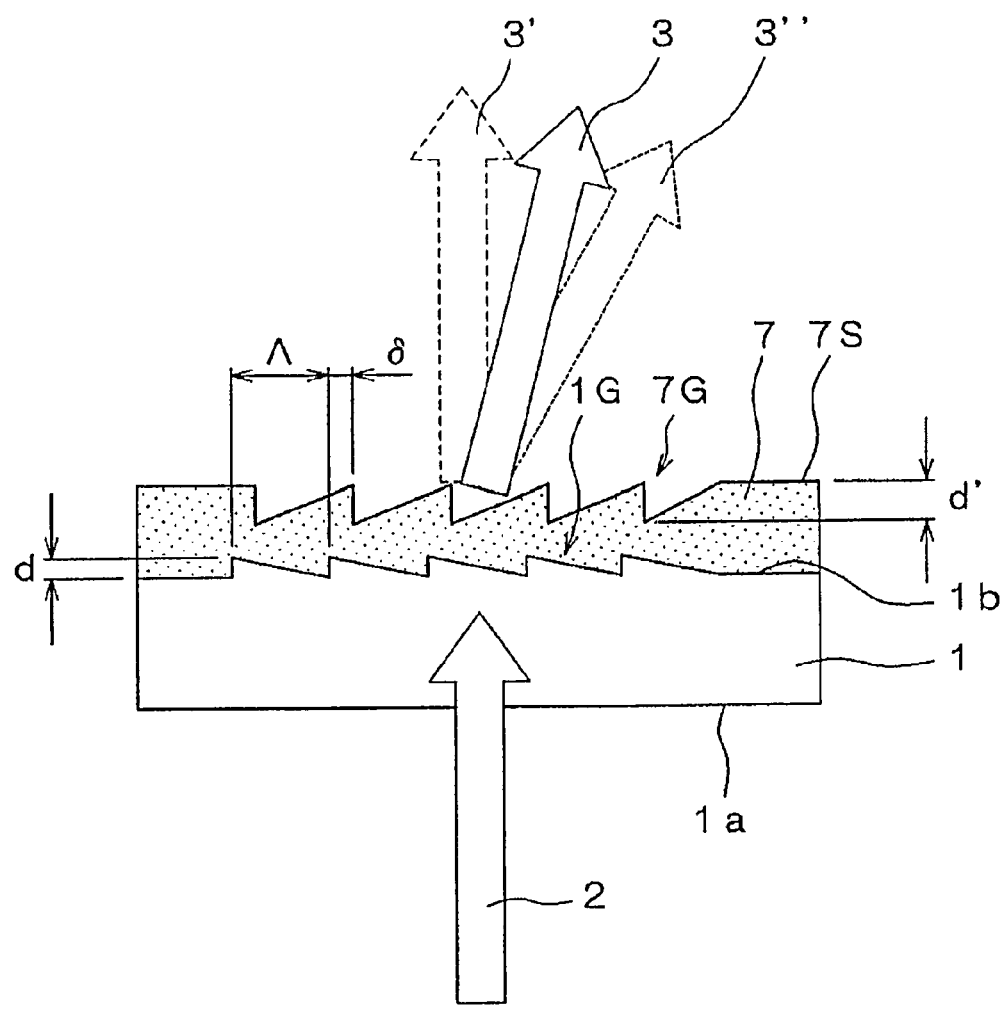
FIG. 7 A cross-sectional view showing a variant of the first embodiment.
Figure 8:
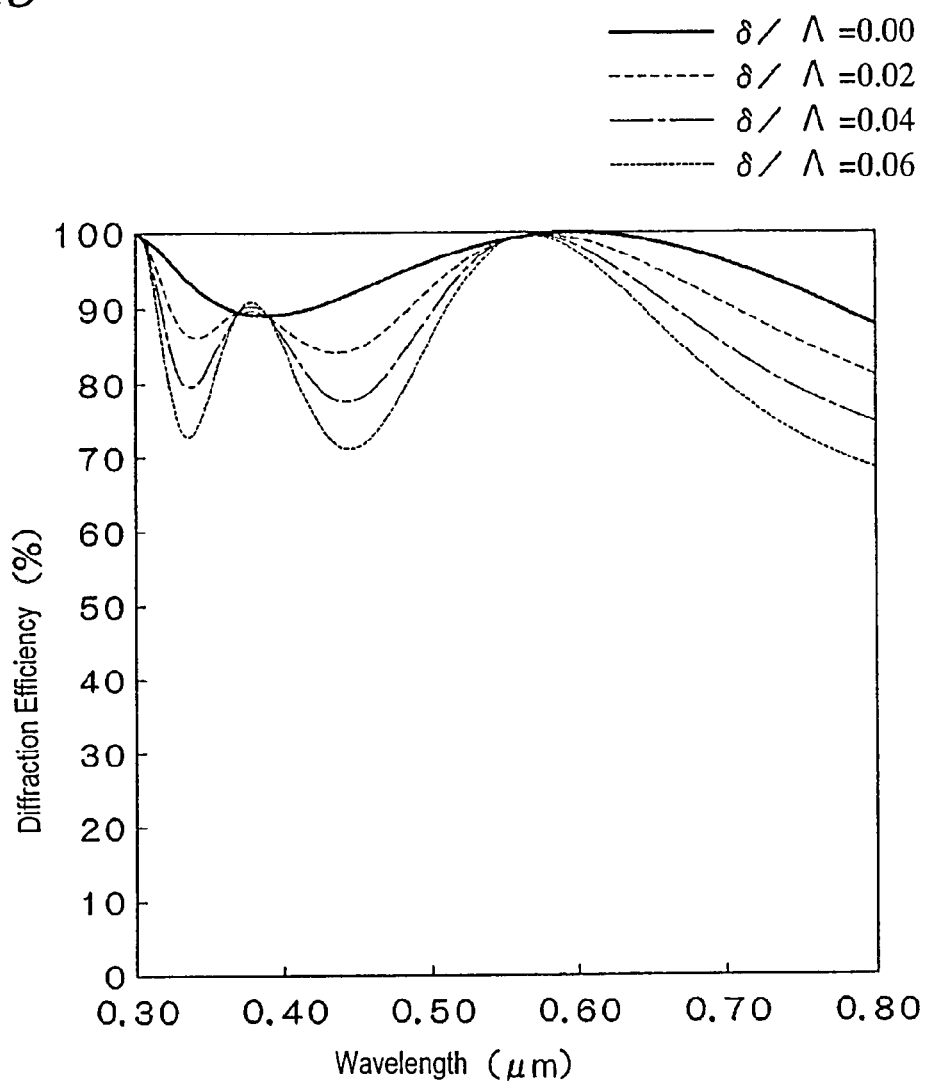
FIG. 8 A graph showing how the wavelength dependence of diffraction efficiency of the optical element of the first embodiment changes with $\delta/\Lambda$.

FIG. 7 shows a variant of the present embodiment. In this example, the edge positions of sawteeth cross sections are offset by δ between the grating 1G and the grating 7G. FIG. 8 shows the wavelength dependence of diffraction efficiency in the case where a parameter δ/Λ is varied under the same condition as in FIG. 5. In order to maintain a high performance, it is preferable to satisfy |δ/Λ|<0.05.

Although gratings (1G, 7G) are formed on only one face (1b) of a lens in the present embodiment, similar structures may be formed on both faces (1a, 1b) of the lens.

Embodiment 2

Next, with reference to FIG. 9, a second embodiment of the optical element according to the present invention will be described. The optical element of the present embodiment has the same construction as that of the optical element of the first embodiment, except for the pitch and step height of the grating 7G which is formed on the surface 7S of the transparent layer 7.

Figure 9:
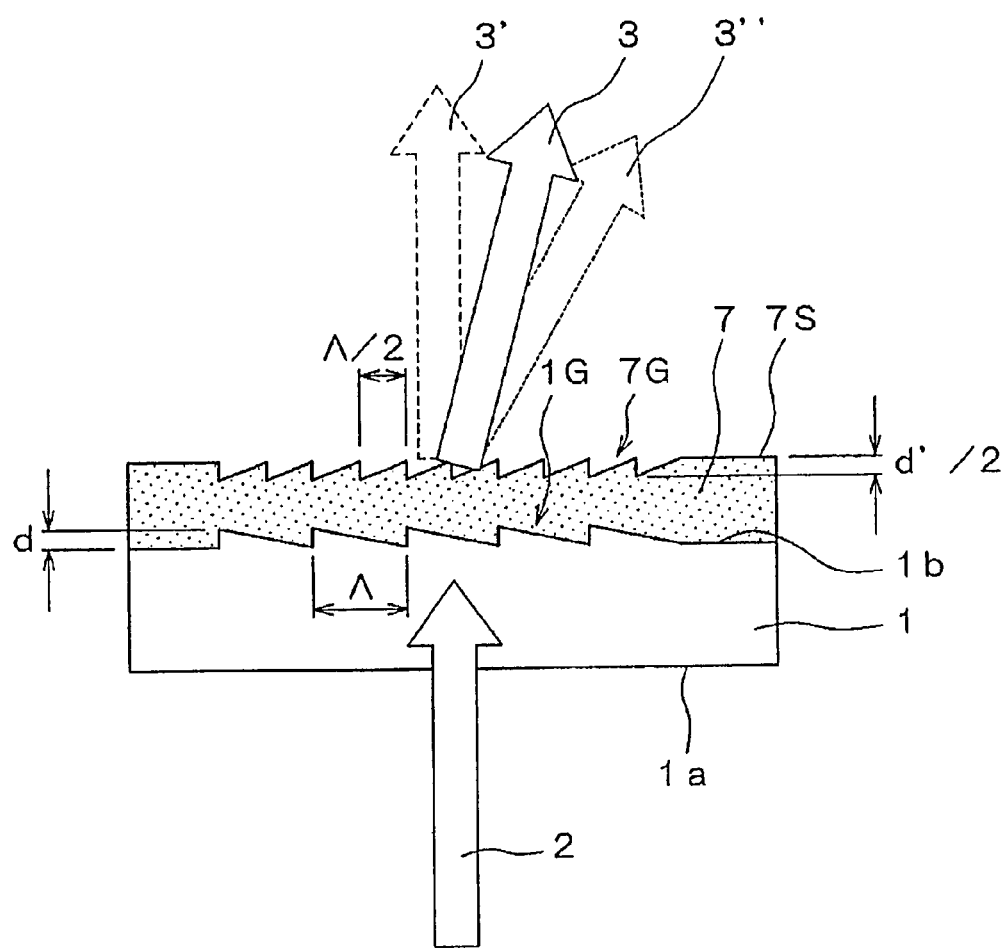
FIG. 9 A cross-sectional view showing a second embodiment of an optical element according to the present invention.
Figure 10:
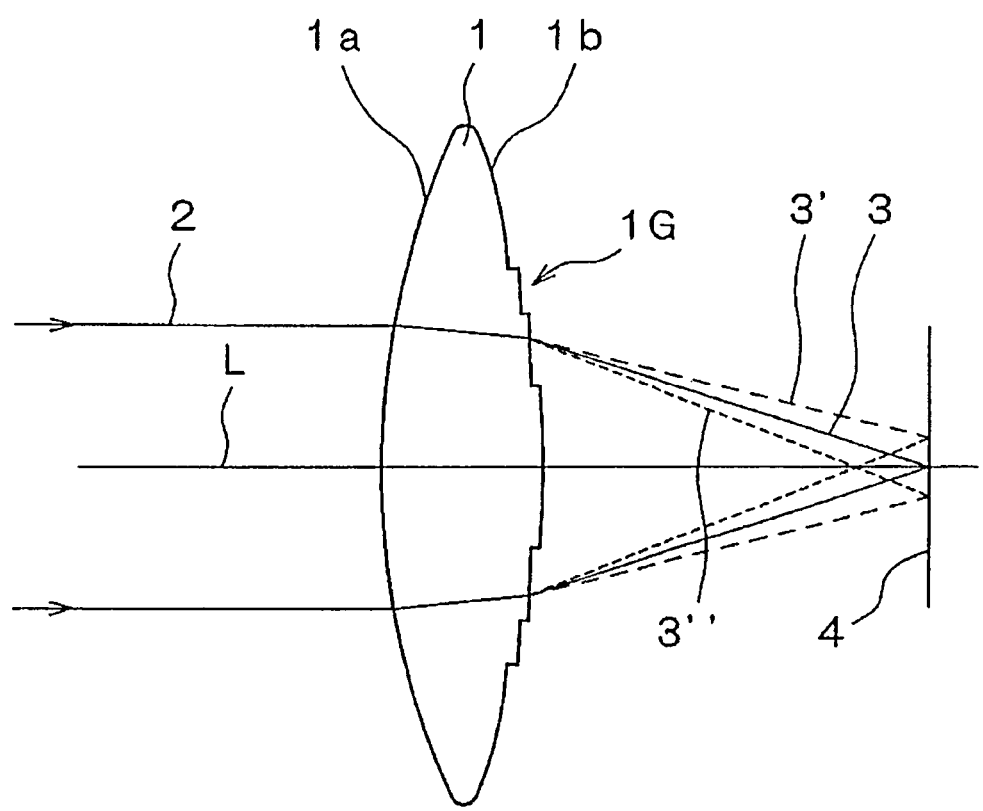
FIG. 10 A cross-sectional view showing a first conventional example of a light-converging device.
Figure 11:
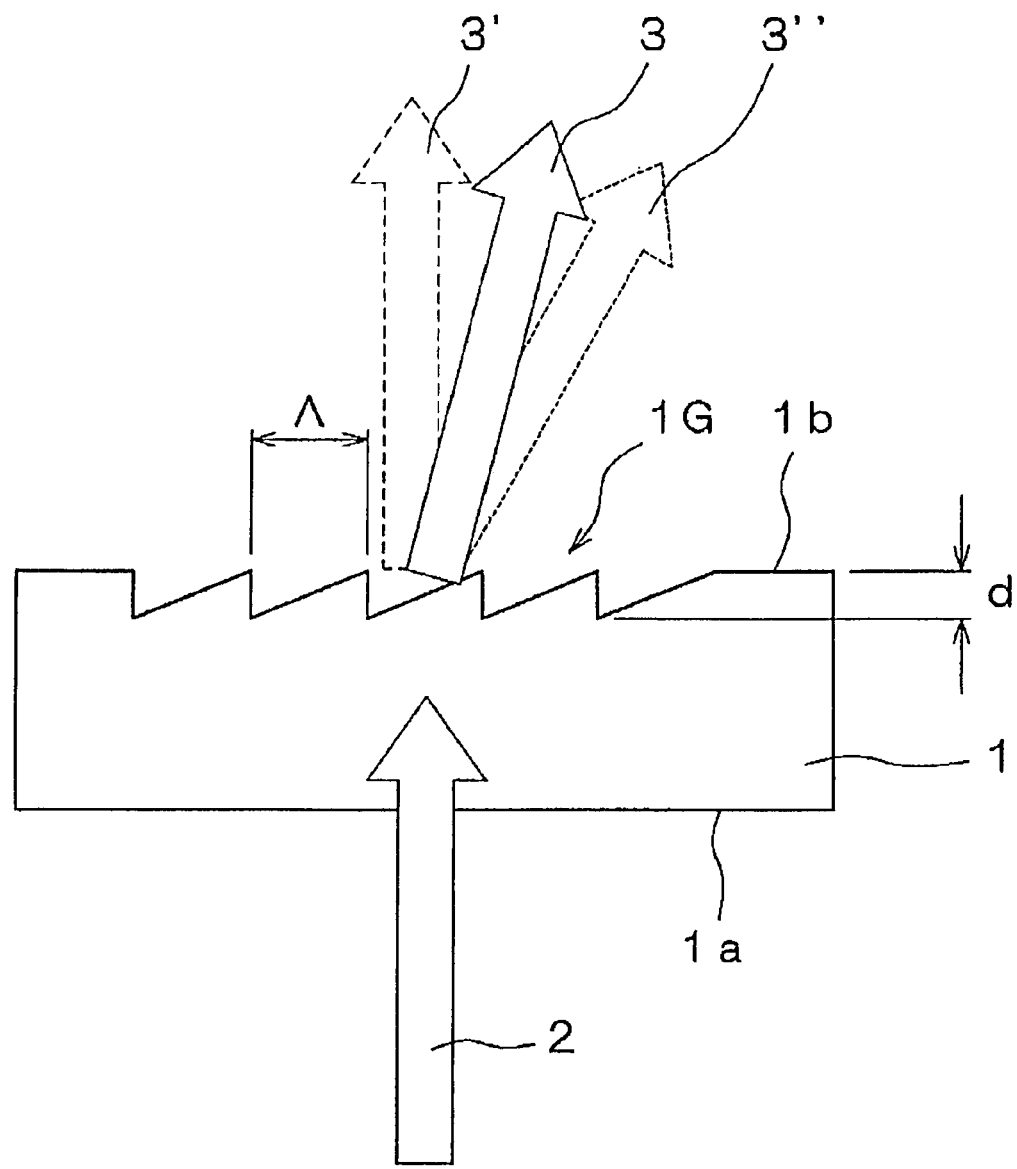
FIG. 11 A cross-sectional view for explaining the diffraction principle of the light-converging device shown in FIG. 10.
Figure 12:
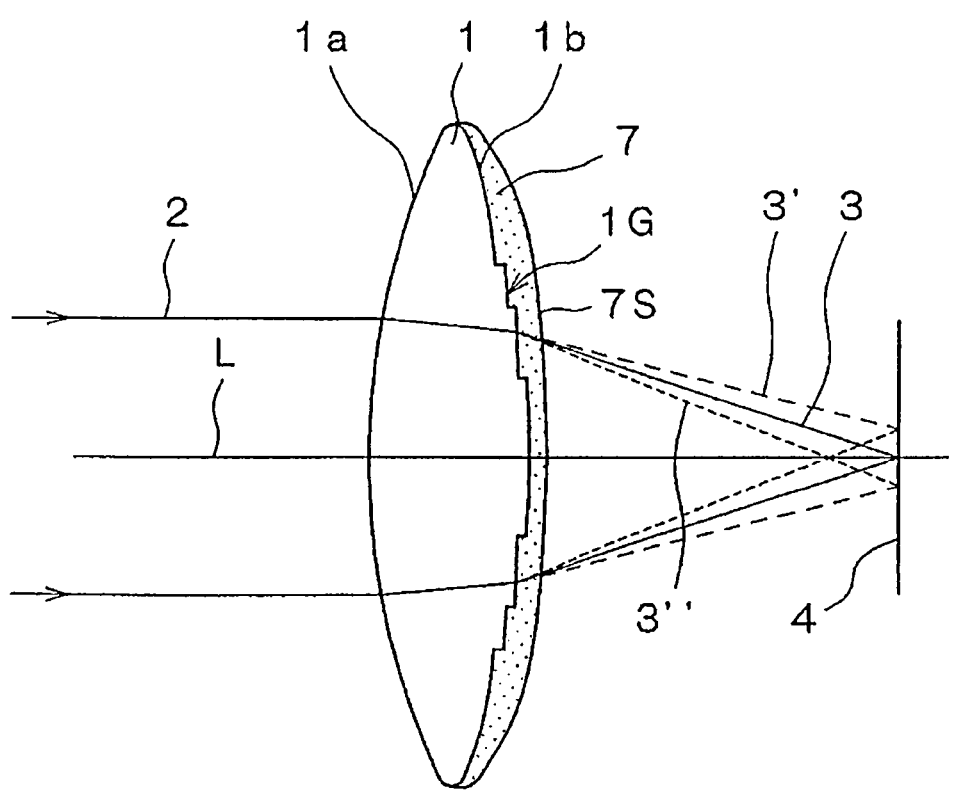
FIG. 12 A cross-sectional view showing a second conventional example of a light-converging device.
Figure 13:
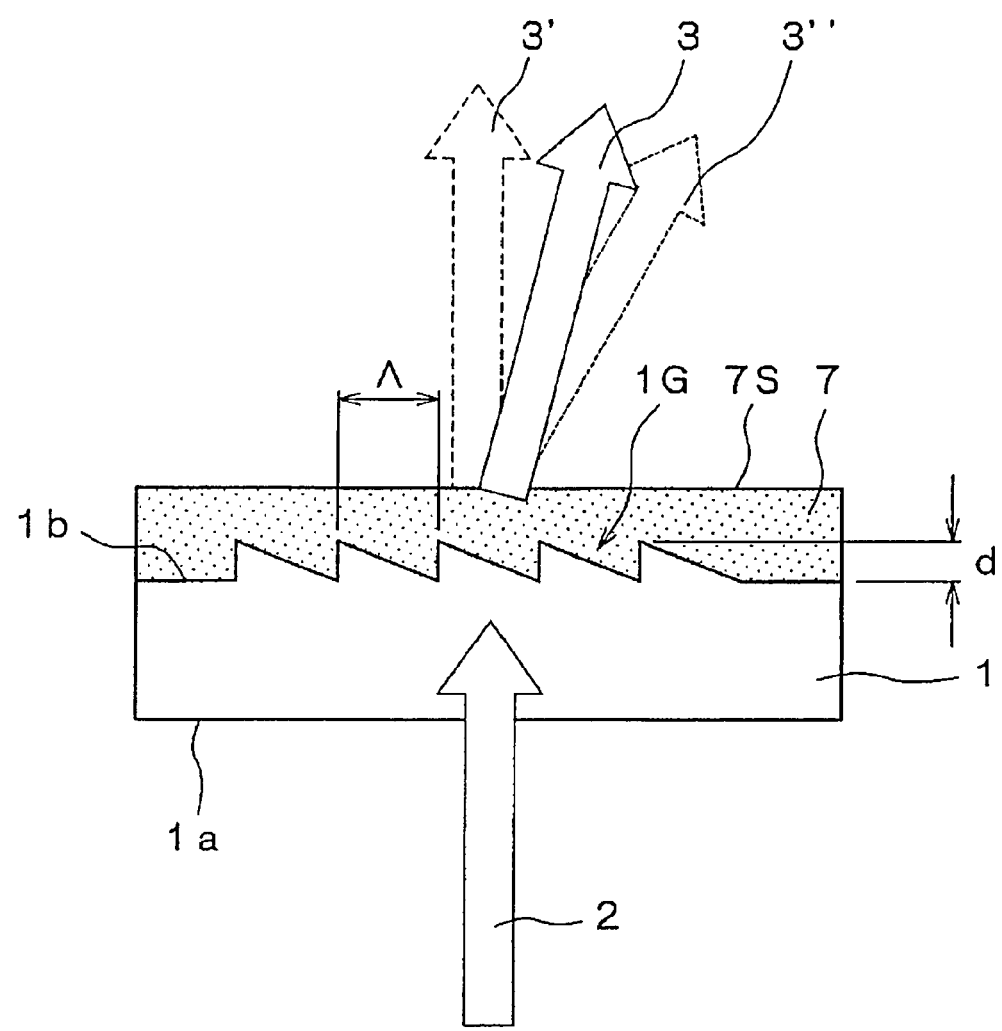
FIG. 13 A cross-sectional view for explaining the diffraction principle of the light-converging device shown in FIG. 12.
Figure 14:
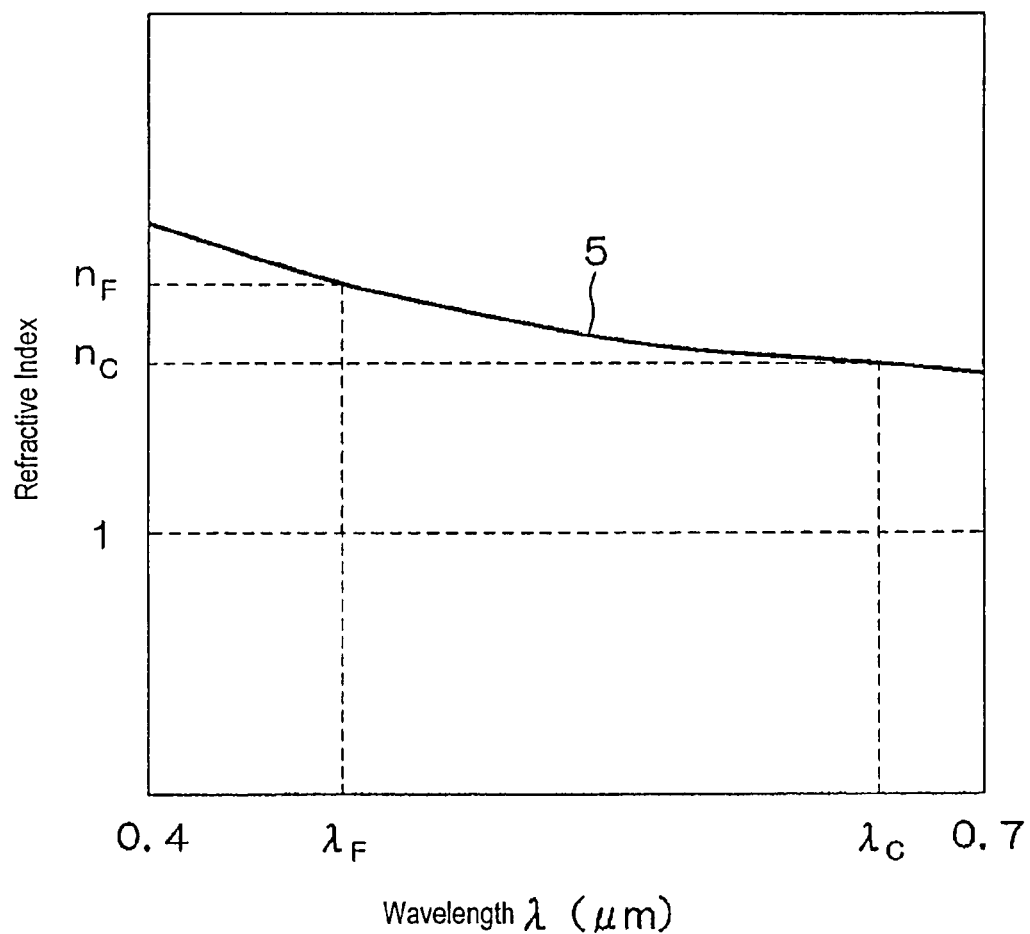
FIG. 14 A graph showing the dispersion characteristics of a material that can be used as a transparent substrate of a light-converging device.
Figure 15:
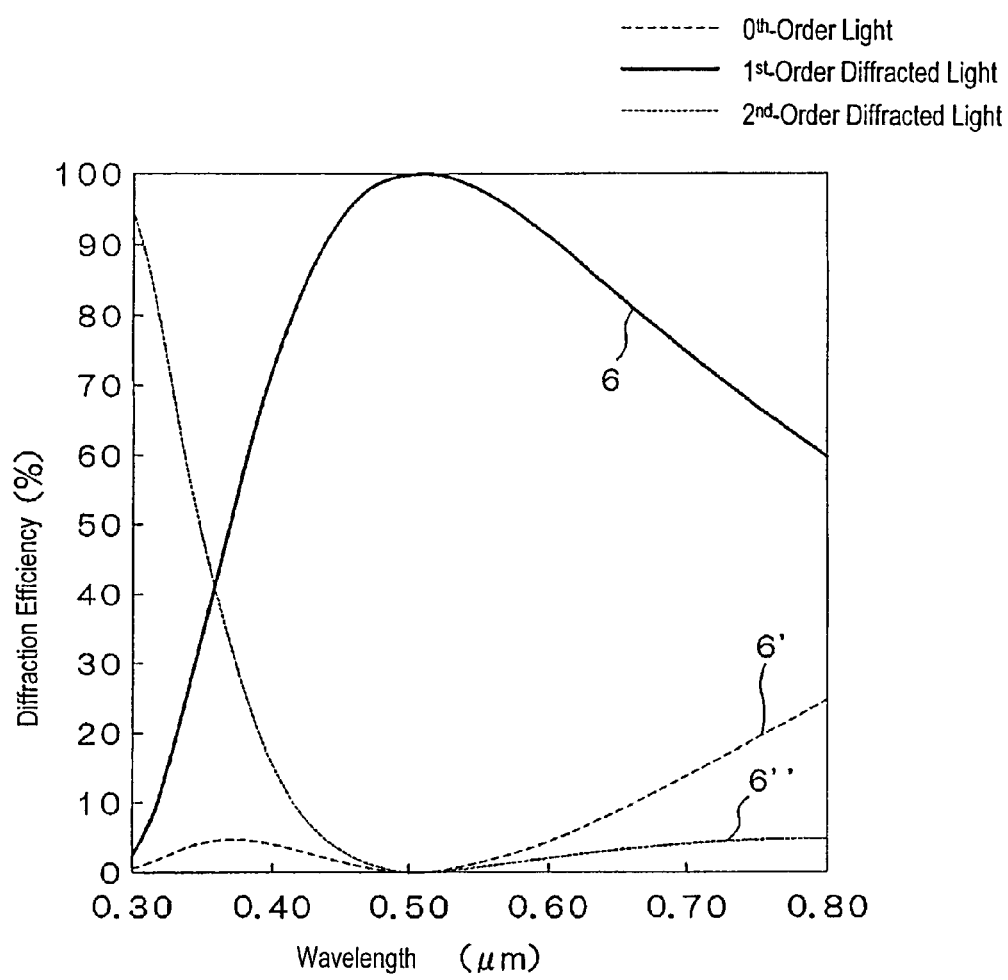
FIG. 15 A graph showing the wavelength dependence of diffraction efficiency in the first conventional example.
Figure 16:
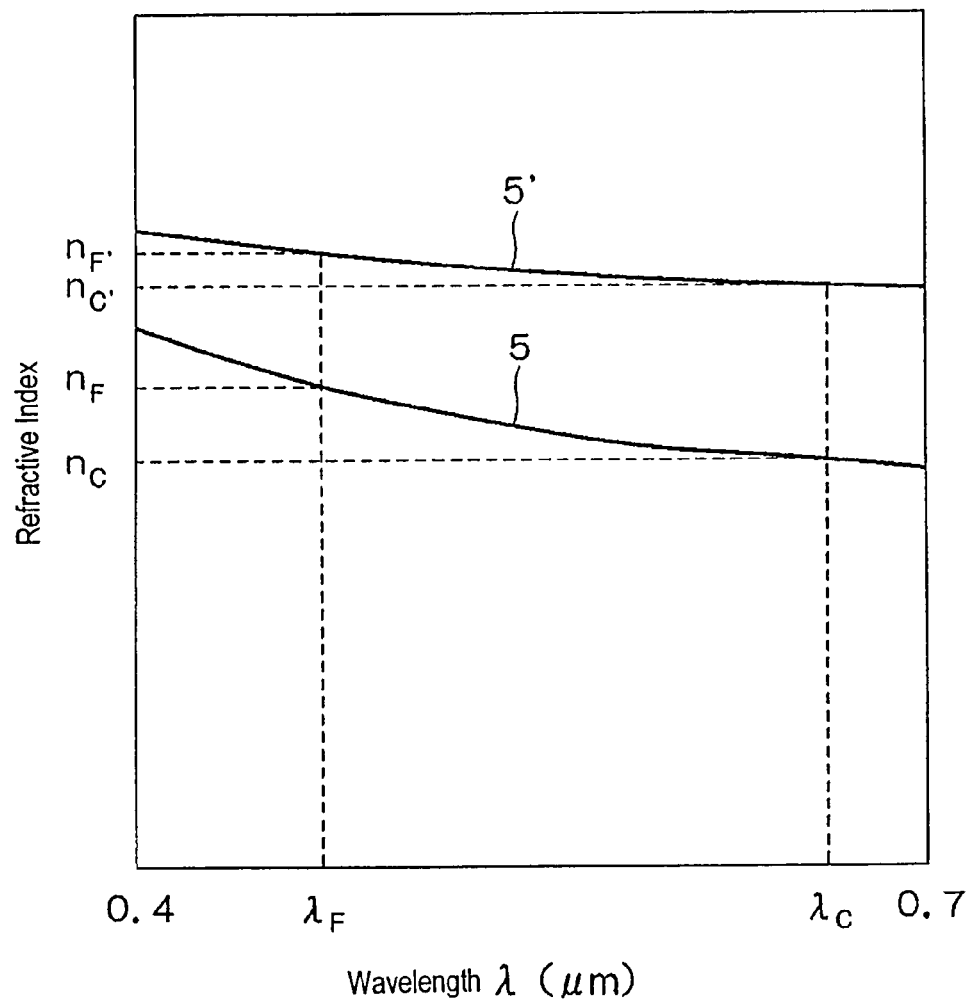
FIG. 16 A graph showing the dispersion characteristics of two types of materials used in the second conventional example.

FIG. 9 is a cross-sectional view showing diffraction at the faces 1b and 7S of the optical element of the present embodiment. For simplicity, it is assumed that the faces 1b and 7S are planar, and that light 2 perpendicularly enters the face 1b.

The substrate 1 has a refractive index n; the transparent layer 7 has a refractive index n'; the grating 1G formed on the face 1b has a pitch Λ and a cross-sectional step height d; and the grating 7G formed on the face 7S has a pitch Λ/2 and a cross-sectional step height d'/2. The values of d and d' are the same as the values in the first embodiment.

The pitch and step height conditions of the grating 1G of the present embodiment have not changed from those of the grating 1G of the first embodiment. Therefore (eq. 15) holds true, and $p^{th}$-order light is diffracted. On the other hand, in the grating 7G, the step height is reduced to half, and therefore $q/2^{nd}$-order light is diffracted based on (eq. 16), assuming that q is an even number.

Thus, q in the right-hand side of (eq. 1) is changed to q/2, but the pitch Λ is also reduced to half (Λ/2) at the same time. Thus, the value of the right-hand side of (eq. 1) does not change, and the diffraction angle θ does not change. As a result, in the gratings 1G and 7G as a whole, diffracted light is generated in the same direction and with the same intensity as in the first embodiment. Therefore, although the pitch and step height of the grating 7G are different, the optical element of the present embodiment provides quite the same effects as those of the first embodiment.

When adopted in a grating having a large pitch, the construction of the present embodiment will make it possible to reduce the grating step height, and therefore the manufacturing of a die which is necessary for forming the grating 7G (cutting/grinding step, etc.) is facilitated. Due to machining errors, the actually-produced step will not be perpendicular to but tilted with respect to the base plane, this machining error leading to light scattering. An effect of reducing light scattering is obtained by reducing the grating step height.

The present embodiment is not limited to those having the illustrated construction. For example, the pitch and step height of the grating 7G may be multiplied by an integer, or divided by an integer. Moreover, the pitch and step height of the grating 1G may be multiplied by an integer, or divided by an integer, or any construction that combines these may be adopted. However, in the case where the step height is divided by an integer, it is necessary that the step height satisfies (eq. 15) and (eq. 16), and at least are not less than their minimum values (i.e., values when p=1,q=1). The relationship between the pitches of the gratings 1G and 7G in the present embodiment only needs to satisfy m×Λ for the grating 1G and n×Λ for the grating 7G, assuming that m and n are integers of 1 or more.

INDUSTRIAL APPLICABILITY

An optical element according to the present invention operates as a light-converging device or a diffraction device, and is able to maintain a high diffraction efficiency across a broad wavelength region. Therefore, the optical element according to the present invention is suitably used for in an optical pickup having an imaging device and a multi-wavelength light source, or the like.

The invention claimed is:

1. An optical element comprising:
a first light transmitting layer placed at a light incident side of the optical element and having a first sawtooth blazed surface, the first sawtooth blazed surface including a plurality of first light-transmitting slopes defining a first blaze angle; and
a second light transmitting layer having a second sawtooth blazed surface including a plurality of second light-transmitting slopes defining a second blaze angle, the second light transmitting layer having a bottom surface, the bottom surface of the second light transmitting layer being in contact with all of the first sawtooth blazed surface of the first light transmitting layer, wherein,
a tilting direction of the first light-transmitting slopes and a tilting direction of the second light-transmitting slopes are opposite,
when the first light transmitting layer has an Abbe number ν; the second light transmitting layer has an Abbe number ν'; the first sawtooth blazed surface has a step height d; and the second sawtooth blazed surface has a step height d', the relationship d'/d<ν'/ν−1 is satisfied;
light which passes the first and second light transmitting layer is immediately output to an outside of the optical element directly from the second light transmitting layer,
when the first light transmitting layer has a refractive index n; the second light transmitting layer has a refractive index n'; the first sawtooth blazed surface has a step height d; the second sawtooth blazed surface has a step height d'; and light being used has an average wavelength λ,
{d(n'−1)−d(n−n')}/λ is within a range of ±0.2 around an integer value.

2. The optical element of claim 1, wherein the first light transmitting layer has a lens shape.

3. The optical element of claim 1, further comprising a lens-shaped member, wherein,
the first light transmitting layer is supported by the lens-shaped member.

4. The optical element of claim 1, wherein the first light-transmitting slopes on the first sawtooth blazed surface are arranged with an arraying pitch which varies with position on the first light transmitting layer.

5. The optical element of claim 1, wherein a refractive index and dispersion of the first light transmitting layer are higher than a refractive index and dispersion of the second light transmitting layer.

6. The optical element of claim 1, wherein an amount of offset $\delta$ between an arbitrary one of the plurality of first light-transmitting slopes and the second light-transmitting slope through which light having been transmitted through the first light-transmitting slope is transmitted is 5% or less of an arraying pitch $\Lambda$ of the first light-transmitting slope where the first light-transmitting slope is positioned.

7. The optical element of claim 1, wherein, when a pitch of the first sawtooth blazed surface is expressed as m×$\Lambda$, a pitch of the second sawtooth blazed surface is expressed as n×$\Lambda$, each of m and n being an integer of 1 or more.

* * * * *